United States Patent
Keller et al.

(10) Patent No.: US 12,486,432 B2
(45) Date of Patent: Dec. 2, 2025

(54) COMPOSITE FILMS WITH AN OBSCURATION AREA

(71) Applicant: KURARAY EUROPE GMBH, Hattersheim (DE)

(72) Inventors: Uwe Keller, Avon (FR); Martin Steuer, Liederbach (DE); Shinichi Muguruma, Okayama (JP); Hideki Oomoto, Okayama (JP); Florian Mummy, Frankfurt am Main (DE)

(73) Assignee: Kuraray Europe GmbH, Hattersheim (DE)

( * ) Notice: Subject to any disclaimer, the term of this patent is extended or adjusted under 35 U.S.C. 154(b) by 180 days.

(21) Appl. No.: 18/028,237

(22) PCT Filed: Sep. 24, 2021

(86) PCT No.: PCT/EP2021/076320
§ 371 (c)(1),
(2) Date: Mar. 24, 2023

(87) PCT Pub. No.: WO2022/063962
PCT Pub. Date: Mar. 31, 2022

(65) Prior Publication Data
US 2023/0332020 A1    Oct. 19, 2023

(30) Foreign Application Priority Data
Sep. 28, 2020    (EP) .................... 20198614

(51) Int. Cl.
| | | |
|---|---|---|
| *B32B 3/10* | (2006.01) |
| *B32B 7/06* | (2019.01) |
| *B32B 17/10* | (2006.01) |
| *C09D 11/102* | (2014.01) |
| *C09J 7/24* | (2018.01) |

(52) U.S. Cl.
CPC ............... *C09J 7/245* (2018.01); *B32B 7/06* (2013.01); *B32B 17/10036* (2013.01); *B32B 17/10275* (2013.01); *B32B 17/10761* (2013.01); *C09D 11/102* (2013.01); *B32B 2250/04* (2013.01); *B32B 2255/10* (2013.01); *B32B 2255/26* (2013.01); *B32B 2307/4023* (2013.01); *B32B 2307/7376* (2023.05); *B32B 2605/00* (2013.01)

(58) Field of Classification Search
None
See application file for complete search history.

(56) References Cited

U.S. PATENT DOCUMENTS

| | | | |
|---|---|---|---|
| 4,998,784 A | | 3/1991 | Freeman et al. |
| 8,002,938 B2 * | | 8/2011 | Elwakil ............... B41M 5/0064 |
| | | | 156/196 |
| 2003/0214715 A1 | | 11/2003 | Bermel |
| 2016/0243769 A1 | | 8/2016 | Shibutani et al. |
| 2016/0243796 A1 * | | 8/2016 | Mannheim Astete ...... |
| | | | B32B 17/10348 |
| 2020/0031206 A1 * | | 1/2020 | Sweney ............. B60J 1/02 |

OTHER PUBLICATIONS

International Search Report issued Jan. 5, 2022 in PCT/EP2021/076320, 4 pages.
Written Opinion issued Jan. 5, 2022 in PCT/EP2021/076320, 7 pagees.

* cited by examiner

*Primary Examiner* — Christopher M Polley
(74) *Attorney, Agent, or Firm* — Element IP, PLC

(57) ABSTRACT

The present invention relates to a composite film comprising a polyvinyl acetal with an obscuration area which is provided on a carrier film.

11 Claims, No Drawings

COMPOSITE FILMS WITH AN OBSCURATION AREA

The present invention relates to a composite film comprising a polyvinyl acetal with an obscuration area which is provided on a carrier film.

Interlayer films comprising polyvinyl acetals are long known as adhesive layer for laminating glass. Especially plasticized polyvinyl butyral (PVB) films are widely used as adhesive layers for glass-glass laminates, e.g. for windshields in automotive use.

It is also known to use an interlayer film which is non-transparent to visible light in certain regions of the windshield in order to protect the sealing or the adhesive which mechanically connects the windshield with the chassis from UV radiation and to hide sensor systems from being seen from the outside of the vehicle for aesthetic reasons.

It is further known to use patches of rather thin, non-transparent plastic films in combination with the common plasticized PVB films to introduce this obscuration. For example, WO 2019/038043 A1 discloses thin, non-plasticized PVB films with printed obscuration areas.

However, there is still a need in the industry for improved means to provide a laminated glass with an obscuration area, especially for use in windshields for vehicles.

Accordingly, the objective of the present invention was to provide a film with an obscuration area with improved characteristics, wherein the improvements include better processibility, especially during the printing process as well as during storage and/or transportation, lower manufacturing costs and/or higher optical quality, especially in terms of optical defects like wrinkles, bubbles or grains, less haze and/or less yellowness.

These and other problems have been solved by the present invention.

In a first aspect, the present invention concerns a composite film comprising a film A containing a polyvinyl acetal and optionally, a plasticiser; and a carrier film, wherein film A is provided with an obscuration area.

The amounts specified for content of plasticizer and other ingredients in the separate films as well as all dimensions like thickness and surface roughness shall refer to the state "prior to lamination", i.e. refers to the state of the films A and B prior to having any contact to each other.

The term "obscuration area" refers to a region of the film A having a light transmission in the visible spectrum (380 to 780 nm) of less than 10%. In a variant, the obscuration area may fade out towards transparency, e.g. in form of dotted areas or a gradient, or the obscuration area might be provided with transparent areas embedded therein, e.g. to provide a viewing area for cameras. In such variants, at least a part of the obscuration area shall have a light transmission in the visible spectrum of less than 10%.

The term "composite film" shall denote a film comprising at least two separate layers wherein during production, one film is deposited onto the other film. In the context of the present invention, the film A is deposited onto a carrier film, preferably by solvent casting.

For uniform obscuration areas, i.e. wherein the obscuration area does not fade out or does not have dotted patterns, a colouring agent (pigment or dye) can be added to the bulk polyvinyl acetal starting material before production of the composite film.

It is however preferred that the obscuration area is provided by a printed or coated ink layer on the surface of film A not facing the carrier film. This preferred embodiment allows to provide more complicated patterns like dotted areas or a fading, e.g. from black to grey or black to transparent.

The material of the carrier can be chosen from any material with is compatible with the polyvinyl acetal as well as with the production method used to provide the composite films. Thus, the carrier material could be glass or metal. However, it is preferred to use a polymer material selected from the group consisting of polylactic acid, acrylonitrile-butadiene-styrene copolymer, polyamides, polycarbonates, polyethylene terephthalate (PET), polyethylene terephthalate copolymers, polyhydroxyalkanoates, polyurethanes, polyolefines such as polyethylene or polypropylenes, acrylonitrile styrene acrylate, polyacrylates and polymethacrylates, polyvinyl alcohol, TAC (cellulose tri acetate). Most preferably, the carrier contains polyethylene terephthalate (PET) and specifically, the carrier is a film consisting of PET.

Preferably, the thickness of the carrier film is from 10 to 500 µm, more preferably from 25 to 250 µm, and most preferably from 50 to 100 µm.

Also preferably, film A is adhered to the carrier film with an adhesive strength of 0.05 to 10 N/3 cm, preferably 0.1-5 N/3 cm and most preferably 0.5-3 N/3 cm.

It has been found that using a composite film with this adhesive strength and this range of thickness of the carrier film allows for the provision of very thin films A with an obscuration area. The film A should be as thin as possible because it is generally cut into shape and used only as a patch in a certain area of the windshield. In one variation of cutting, the film A is cut by a steel die or by a laser whereas the carrier stays intact (also called kiss-cut). Printed parts can thus be cut to final size and contour and kept from damage or contamination owing to the stabilizing effect and protection offered by the carrier film whereas cutting the free-standing film A without carrier would be extremely difficult for very thin films. However, the thinner the film A, the better because it causes less variance in the total thickness of the combined interlayer film for lamination.

Preferably, the thickness of the film A is from 5 to 100 µm, more preferably from 10 to 50 µm and specifically from 20 to 40 µm.

If the surface of the film A is to be printed or coated, it is advantageous to have a smooth surface to be printed on in order to provide a homogenous printing pattern. However, the opposite site of the film A, which is not being printed or coated, advantageously has a certain roughness Rz. This roughness allows for an improved de-airing during the lamination process as well as it allows for a patch of film A to be handled more easily as it sticks less to the glass or the plasticized polyvinyl acetal film B before being laminated.

It has now been found that a certain roughness Rz of the carrier allows for the production of a film A with one very smooth surface and one surface with a certain roughness, especially when using a solvent casting process. The certain roughness of the surface of the film A can be adjusted by choosing a carrier with a complementary roughness while the other surface of the film A is very smooth owing to the production conditions of a solvent casted film.

Preferably, the surface roughness Rz of the surface of film A to be coated or printed is from 0.01 to 10 µm, preferably from 0.1 to 3.0 µm, measured before said surface is coating or printing on.

Also preferably, the surface roughness Rz of the carrier film on the surface in contact with film A is from 1.0 to 10 µm, preferably from 2.0 to 6.0 µm, measured before the carrier film and the film A come into in contact.

The printed or coated layer contains an inorganic or organic pigment, which should not dissolve in the polyvinyl acetal and thus resist migration from film A to B or bleeding out of the printed layer.

As pigments, preferable carbon black, iron oxides, polyaniline, perylenes or spinel pigments are used. The pigments may be dispersed in a carrier fluid like water, alcohol or mixtures of alcohol and water.

Water-based printing inks are preferred over printing inks based on organic solvents since they do not swell or dissolve the film A and/or lead to film defects. Printing inks based on organic solvents can be used if the coating is thin and/or the drying step is fast such that the solvent does not migrate into the PVB film.

The printing inks can be formulated and applied via techniques that are commonly known in the printing industry such as offset printing, rotogravure printing, flexography, and screen-printing, followed usually by a drying step.

The dry-film thickness of the printed layer is from 1 to 50 µm depending on printing technique and required opacity. Usually the dry-film thickness is from 2 to 20 µm. High enough total dry-film thicknesses can be achieved by overlaying ink-layers through repetition of sequential printing/coating steps.

Preferably, the ink comprises one or more binders selected from the group consisting of vinyl pyrrolidone, a water-soluble acrylic resin, an alcohol-soluble resin, e.g. a phenol resin, an acrylic resin, a styrene-maleic resin, a styrene acrylate resin, a polyurethane resin, a polyvinyl acetal resin, a polyvinyl alcohol resin or a ketone resin, most preferably the ink comprises a polyurethane resin binder.

Film A might contain alkali metal ions; potassium or sodium or lithium are preferred. Preferred ranges of concentration of the alkali metal ions are 7-210, preferably 14-140 and more preferably 21-140 ppm in the case of lithium, 23-690, preferably 46-460 and more preferably 69-460 ppm in the case of sodium and 39-1170, preferably 78-780 ppm and more preferably 117-780 in the case of potassium. It is furthermore preferred to add the alkali metal ions in form of salts of carboxylic acids having 1 to 10 carbon atoms. Especially preferred is potassium acetate as adhesion control agent.

The total amount of alkali metal salts may be as low as 0.005% by weight based on the weight of film A. Preferred ranges of alkali metal salt are 0.01%-0.1%; 0.02-0.08%; 0.03-0.06%, each weight % based on the weight of film A.

Film A used in the laminates of the invention may additionally comprise alkaline earth ions, but since their effect on adhesion is limited, relatively small amounts as compared to the alkali ion should be used. In a first embodiment of the invention film A comprises 0 to 100 ppm alkaline earth ions, preferably 10 to 50 ppm.

Film A used in the laminates of the invention may also comprise only alkaline earth ions as adhesion control agents, i.e. film A does not comprise any alkali metal ions. In that case, the concentration of the alkaline earth metal ions is from 500 to 5000 ppm, preferably 750 to 4000 ppm, and more preferably 1500 to 3000 ppm. Magnesium ions are especially preferred and can be added in form of magnesium carboxylic acid salts such as magnesium acetate and/or magnesium neoate.

In order to avoid haze, the amount of chloride ions and/or nitrate ions and/or sulphate ions in film A may be reduced.

The chloride content of the film A can thus be less than 150 ppm, preferably less than 100 ppm, and in particular less than 50 ppm. In the ideal case, the chloride content of the film A is less than 10 ppm or even 0 ppm.

The nitrate content of film A optionally may be less than 150 ppm, preferably less than 100 ppm, and in particular less than 50 ppm. In the ideal case, the nitrate content of film A is less than 10 ppm or even 0 ppm.

Again optionally, the sulphate content of film A may be less than 150 ppm, preferably less than 100 ppm, and in particular less than 50 ppm. In the ideal case, the sulphate content of the film A is less than 10 ppm or even 0 ppm.

Another aspect of the present invention concerns the free-standing film A without the carrier. It can be obtained by peeling off the carrier from the film A. Thus, one embodiment of the present invention is a film A containing a polyvinyl acetal and optionally, a plasticiser; wherein one surface of the film A is provided with an obscuration area provided by a printed or coated ink layer and wherein the film A is obtained by peeling off the carrier from the film A.

There are several ways to use the composite film of the present invention in the production of laminated windshields together with a standard (=plasticized) polyvinyl acetal film B. In one simple way, the carrier film is removed and the released printed film A can be prepared for lamination by cutting to size, stacking, attaching to the surface of the standard polyvinyl acetal film B or to one of the inner glass surfaces before the final assembly of glass and interlayer for the lamination process.

Alternatively, the composite film can be processed together in steps like cutting, stacking and attaching to a surface in which the thicker, less elastic and higher melting properties of the carrier film material (such as PET) prove advantageous. Even film A with a thickness of less than 40 µm can be safely handled until the carrier film is removed only shortly before or even during the assembly step. It is also possible to remove the unneeded cut portions/frame of film A from the carrier film and only leave the printed parts in their final size attached to it. It is possible to position such printed "stickers" together with the larger piece of carrier film without even touching film A on the standard polyvinyl acetal film B or one of the inner glass surfaces and use the release properties of the carrier film to 1) pre-bond the printed surface of the thin film A to the surface of cut to size blanks of standard polyvinyl acetal film B by application of heat and pressure or ultrasonic welding 2) optionally stack several of such prepared combined blanks and for storage 3) remove the carrier film from the backside of the "sticker" during assembly before the lamination process starts.

Carrier film with the printed patch attached to it in the form of "stickers" can be easily stored in roll form and can help to prevent sticking and transfer of ink or other surface contaminants to the back side of a printed film A.

Therefore, one embodiment concerns a process for the production of a windshield comprising two sheets of glass, combined by an interlayer film comprising a film A containing a polyvinyl acetal and optionally, a plasticiser; and a film B containing a polyvinyl acetal and a plasticiser in an amount of at least 22% by weight; comprising the following steps, in that order:
  a) positioning the composite film according to any one of claims 1 to 10 to the first glass sheet with the film A facing the first glass sheet;
  b) peeling off the carrier film from the film A; and
  c) positioning the film B on the film A or on the second glass sheet; and
  d) providing a stack of the layers comprising first glass sheet-film A-film B-second glass in that order;
  e) laminating the stack obtained in step d) to produce the windshield.

Another embodiment of the present invention concerns a process for the production of a windshield comprising two sheets of glass, combined by an interlayer film comprising a film A containing a polyvinyl acetal and optionally, a plasticiser; and a film B containing a polyvinyl acetal and a plasticizer in an amount of at least 22% by weight; comprising the following steps, in that order:
  a) positioning the composite film according to any one of claims 1 to 10 to the film B with the film A facing the film B;
  b) peeling off the carrier film from the film A;
  c) providing a stack of the layers comprising first glass sheet-film A-film B-second glass in that order; and
  d) laminating the stack obtained in step c) to produce the windshield.

Yet another embodiment of the present invention concerns a process for the production of a windshield comprising two sheets of glass, combined by an interlayer film comprising a film A containing a polyvinyl acetal and optionally, a plasticiser; and a film B containing a polyvinyl acetal and a plasticizer in an amount of at least 22% by weight; comprising the following steps, in that order:
  a) providing the composite film according to any one of claims 2 to 10 and peeling off the carrier film from the film A;
  b) positioning the film A on the first glass sheet with the surface of film A provided with a printed or coated ink layer away from the first glass sheet;
  c) positioning the film B on film A or on the second glass sheet;
  d) providing a stack of the layers comprising first glass sheet-film A-film B-second glass in that order; and
  e) laminating the stack obtained in step c) to produce the windshield.

When combining the printed area of film A with the ceramic print on either glass surface, a high degree of precision is required for the positioning task. To this end, the printed patch can be moved into the desired position by an human operator, who manually aligns the print features of the patch with the print features on the glass. Such alignment can be done for the patch alone (with or without carrier film) and with or without having it attached to a larger blank of regular PVB film (film B). In another step, the edges of the second glass can also be aligned to these of the first glass as it is common in the industry. An optical system can be used to facilitate the alignment task. As one example, such optical system can consist in laser spots projected on the regular PVB and positioning marks printed on film A as part of the main design or in positions that will be hidden by ceramic frit in the final product. Positioning marks can also be unprinted transparent features within in a fully printed area of film A. A camera system is then used to monitor the good alignment of laser spot and positioning marks. In another variation of the described alignment a robot can be used to automatically take up individual patches (with or without carrier film) from a stack, places it in the correct position on the glass surface or the regular PVB with optional pressing, ultrasound or heat soldering to sufficiently fix it to the substrate before the next layer (i.e. regular PVB or glass sheet) will be placed on top of it. Such robot can use suction cups to lift-up and move the patch and or patch on PVB sheet. A robot can also provide a first lay-up and a second robot can provide for the precise alignment by shifting the patch, the patch on PVB sheet or the ceramic printed glass underneath or above the PVB. In a preferred variation of the invention, a robot picks up printed film A which is cut to final shape, is still attached to the carrier film and has any surrounding matrix already stripped off. The robot then positions the printed patch with carrier film on the regular PVB sheet already placed over the first glass sheet, in a way, that the printed side comes into contact with the PVB sheet, applies heat solder points in a way that when the robot arm is moving up again, the carrier film can be peeled off from the backside of the printed patch and the patch remains pre-adhered on the surface of the PVB sheet. For final positioning, the entire PVB sheet is then carefully moved on the first glass sheet until reaching optimum match with the ceramic printing on this glass sheet. Following this additional layers and the second glass sheet are applied.

In another aspect the present invention concerns a windshield or generally a laminated glass part obtained in one of the processes as described above.

The films A and B used in accordance with the invention contain polyvinyl acetals, which are produced by acetalisation of polyvinyl alcohol or ethylene vinyl alcohol copolymer.

The films can contain polyvinyl acetals, each having a different polyvinyl alcohol content, degree of acetalisation, residual acetate content, ethylene proportion, molecular weight and/or different chain lengths of the aldehyde of the acetal groups.

In particular, the aldehydes used for the production of the polyvinyl acetals can be linear or branched (that is to say of the "n" or "iso" type) containing 2 to 10 carbon atoms, which leads to corresponding linear or branched acetal groups. The polyvinyl acetals are referred to accordingly as "polyvinyl (iso)acetals" or "polyvinyl (n)acetals".

The polyvinylacetal used in accordance with the invention results in particular from the reaction of at least one polyvinyl alcohol with one or more aliphatic unbranched compounds containing 2 to carbon atoms. To this end, n-butyraldehyde is preferably used.

The polyvinyl alcohols or ethylene vinyl alcohol copolymers used to produce the polyvinyl acetals in the films A or B may be identical or different, pure or a mixture of polyvinyl alcohols or ethylene vinyl alcohol copolymers with different degree of polymerisation or degree of hydrolysis.

The polyvinyl acetate content of the polyvinyl acetals in the films A or B can be set by use of a polyvinyl alcohol or ethylene vinyl alcohol copolymer saponified to an appropriate degree. The polarity of the polyvinyl acetal is influenced by the polyvinyl acetate content, whereby the plasticiser compatibility and the mechanical strength of the respective layer also change. It is also possible to carry out the acetalisation of the polyvinyl alcohols or ethylene vinyl alcohol copolymers with a mixture of a number of aldehydes compounds.

The films A or B preferably contain polyvinyl acetals having a proportion of polyvinyl acetate groups, either identically or differently, of 0.1 to 20 mol %, preferably 0.5 to 3 mol %, or 5 to 8 mol %.

The polyvinyl alcohol content of the polyvinyl acetal PA used in film A may be between 6-26% by weight, 8-24% by weight, 10-22% by weight, 12-21% by weight, 14-20% by weight, 16-19% by weight and preferably between 16 and 21% by weight or 10-16% by weight.

Independent of film A, the polyvinyl alcohol content of the polyvinyl acetals PB used in film B may be between 14-26% by weight, 16-24% by weight, 17-23% by weight and preferably between 18 and 21% by weight.

In a preferred embodiment of the invention, film A comprises a polyvinyl acetal PA with a proportion of vinyl alcohol groups from 6 to 26% by weight and the film B comprises a polyvinyl acetal B with a proportion of vinyl alcohol groups from 14 to 26% by weight.

Films A and/or B used in accordance with the invention may contain, as plasticiser, one or more compounds selected from the following groups:
- esters of polyvalent aliphatic or aromatic acids, for example dialkyl adipates, such as dihexyl adipate, dioctyl adipate, hexyl cyclohexyl adipate, mixtures of heptyl adipates and nonyl adipates, diisononyl adipate, heptyl nonyl adipate, and esters of adipic acid with cycloaliphatic ester alcohols or ester alcohols containing ether compounds, dialkyl sebacates, such as dibutyl sebacate, and also esters of sebacic acid with cycloaliphatic ester alcohols or ester alcohols containing ether compounds, esters of phthalic acid, such as butyl benzyl phthalate or bis-2-butoxyethyl phthalate.
- esters or ethers of polyvalent aliphatic or aromatic alcohols or oligo ether glycols with one or more unbranched or branched aliphatic or aromatic substituents, for example esters of glycerol, diglycols, triglycols or tetraglycols with linear or branched aliphatic or cycloaliphatic carboxylic acids; Examples of the latter group include diethylene glycol-bis-(2-ethyl hexanoate), triethylene glycol-bis-(2-ethyl hexanoate), triethylene glycol-bis-(2-ethyl butanoate), tetraethylene glycol-bis-n-heptanoate, triethylene glycol-bis-n-heptanoate, triethylene glycol-bis-n-hexanoate,
- tetraethylene glycol dimethyl ether and/or dipropylene glycol benzoate
- phosphates with aliphatic or aromatic ester alcohols, such as tris(2-ethylhexyl)phosphate (TOF), triethyl phosphate, diphenyl-2-ethylhexyl phosphate, and/or tricresyl phosphate
- esters of citric acid, succinic acid and/or fumaric acid.

By definition, plasticisers are organic liquids having a high boiling point. For this reason, further types of organic liquids having a boiling point above 120° C. can also be used as plasticiser.

However, film A preferably does not contain any added plasticizer.

The present invention is also advantageous for laminates comprising thin glass sheets, since sintering enamels on thin glass is even more prone to produce off-spec bended sheets with optical flaws. In a preferred embodiment of the invention, at least one of the glass sheets has a thickness of less than 2.1 mm, such as 1.8 mm, less than 1.8 mm; less than 1.6 mm; less than 1.4 mm; less than 1.0 mm; or less than 0.9 mm. The term "glass sheet" shall be read as any material useful for the production of windshield, including polycarbonate sheet.

Plasticiser-containing films B used in accordance with the invention contain, in the starting state prior to lamination, at least 22% by weight, such as 22.0-45.0% by weight, preferably 25.0-32.0% by weight and in particular 26.0-30.0% by weight plasticiser.

The films A or B preferably contain polyvinyl acetals having a proportion of polyvinyl acetate groups, either identically or differently, of 0.1 to 20 mol %, preferably 0.5 to 3 mol %, or 5 to 8 mol %.

The thickness of film B in the starting state is 450-2500 μm, preferably 600-1000 μm, preferably 700-900 μm. A plurality of films B may be used in the invention, either being stacked on each other or separated by films A.

If films B are stretched prior to production of the sandwich and/or additionally are adapted to the shape of a screen (for example a windscreen) in a curved manner, the specified thicknesses at the moment of lamination may reduce once more by up to 20%.

In addition, films A and B may contain further additives, such as residual quantities of water, UV absorber, antioxidants, adhesion regulators, optical brighteners or fluorescent additives, stabilisers, colorants, processing aids, inorganic or organic nanoparticles, pyrogenic silicic acid and/or surface active substances.

In particular, film B may comprise 0.001 to 0.1% by weight of alkaline metal salts and/or alkaline earth salts of carboxylic acids as adhesion control agent. It is preferred that film B contains magnesium ions in an amount of at least 10 ppm, preferably 20 ppm and most preferably 30 ppm.

The lamination step for producing a laminated glass is preferably carried out such that films A and B are positioned between two glass sheets and the layered body thus prepared is pressed under increased or reduced pressure and increased temperature to form a laminate.

To laminate the layered body, the methods with which a person skilled in the art is familiar can be used with and without prior production of a pre-laminate.

So called "autoclave processes" are carried out at an increased pressure from approximately 10 to 15 bar and temperatures from 100 to 150° C. during approximately 2 hours. Vacuum bag or vacuum ring methods, for example according to EP 1 235 683 B1, function at approximately 200 mbar and 130 to 145° C.

Vacuum laminators may also be used. These consist of a chamber that can be heated and evacuated, in which laminated glazings can be laminated within 30-60 minutes. Reduced pressures from 0.01 to 300 mbar and temperatures from 100 to 200° C., in particular 130-160° C., have proven their worth in practice.

It is also possible for the films B to have a wedge-shaped thickness profile. The laminated glass laminate according to the invention obtains a wedge-shaped thickness profile even with plane-parallel thickness profile of the film A and can be used in motor vehicle windscreens for HUD displays.

The laminated glass according to invention may be used for windscreens, back-lights and side glazing for cars, busses, trucks, ships, trains or airplanes.

EXAMPLES

Preparation of the Composite Film

A polyethylene terephthalate (PET) film with a matt surface (grade #50-X42G commercially available from Toray Industries, Inc.) with a thickness of 50 μm was used as carrier. The surface roughness (Rz) was 4.0 μm.

A 15.5% by weight solution of polyvinyl butyral (PVB) powder (a 45:55 mixture of commercially available grades Mowital® B30H and Mowital® B75H) dissolved in a mixture of methanol/methyl acetate=50:50% by weight was used as coating fluid.

A commercially available standard solvent coating apparatus including an unwinder, a coater, a dryer and a winder was used in slot die coating mode. The substrate speed was 1.1 m/min and the wet thickness on the moving substrate was 200 μm. The coating was conducted at a temperature of 26° C. The gap between the coating lip and the moving substrate was 300 μm.

The drying was performed in three sections and the respective temperatures in the drying sections were set to 60° C., 70° C. and 125° C. The total drying time was approximately 4 min.

The composite film comprising the PVB film A and the PET carrier was wound into rolls. No wrinkles could be identified in the composite film when inspected by eye. The carrier was peeled off from a sample of the composite to measure the thickness of the dry film A. The measurement showed that the film A had a thickness of 25 μm.

A set of five 3 cm wide and 15 cm long specimens were cut from the composite film and the t-peel adhesive strength was measured with a tensile tester at 20° C. and at a pulling speed of 500 mm/min. The average from the 5 measurements was found to be 1.5 N/3 cm.

Printing onto the Composite Film

The composite film used in the first step was used in the following printing process.

A water-based printing ink comprising carbon black-based pigments and polyurethane-based binders was used in the printing process. The printing ink had a viscosity of 20 DIN-seconds (20° C., DIN 4 mm cup).

The printing ink was applied to the film A of the composite film using a flexographic printing machine. In a first step, the composite film went through an in-line corona treatment unit to improve the ink adhesion on the surface of film A. The corona treated film then went through four printing units which were all equipped with flexible Kodak Flexcel NX relief plates. Furthermore, the first printing unit was equipped with a Zecher 160 L/cm, 10 g/m2(60°) anilox roller, the second one with a Zecher 220 L/cm, 10 g/m2 (60°), the third one with an Apex 180 L/cm, 12 g/m2 (open) and the fourth one with a Zecher 120 L/cm, 20 g/m2 (60°). The drying temperature in the printing units was set to 55° C. After passing the printing units, the composite film went also through an additional drying zone (4 m), which was set to 70° C. During the whole printing process the composite film went through the printing machine with a speed of approximately 80 m/min.

At the end of the printing process, the composite film was wound on PVC roll core with a diameter of 6 inch.

Due to the PET carrier film no undried ink was transferred to the bottom side of the PVB film in the wound polymer film roll. The dried ink formed a homogeneously closed layer (dry film thickness of around 7 μm) on the PVB substrate, which appeared completely opaque after visual inspection. The optical density of the dried ink layer was measured with a transmission densitometer (x-rite, model 331C) and was above 3.5.

The invention claimed is:

1. A composite film comprising:
    a film A containing a polyvinyl acetal and optionally a plasticiser; and
    a carrier film,
    wherein film A is provided with an obscuration area,
    wherein the obscuration area is provided by a printed or coated ink layer on the surface of film A not facing the carrier film,
    wherein a surface roughness Rz of the surface of film A to be coated or printed is from 0.1 to 3.0 μm, measured before said surface is coated or printed on, and
    wherein a surface roughness Rz of the carrier film on the surface in contact with film A is from 2.0 to 6.0 μm, measured before the carrier film and the film A come into contact.

2. The composite film according to claim 1 wherein the carrier film contains a polymer selected from the group consisting of polylactic acid, acrylonitrile-butadiene-styrene copolymer, polyamides, polycarbonates, polyethylene terephthalate, polyethylene terephthalate copolymers, polyhydroxyalkanoates, polyurethanes, polyolefins, acrylonitrile styrene acrylate, polyacrylates and polymethacrylates, polyvinyl alcohol, and TAC (cellulose tri acetate).

3. The composite film according to claim 1 wherein a thickness of the film A is from 15 to 40 μm.

4. The composite film according to claim 1 wherein a thickness of the carrier film is from 25 to 250 μm.

5. The composite film according to claim 1 wherein film A is adhered to the carrier film with an adhesive strength from 0.05 to 10 N/3 cm.

6. The composite film according to claim 1 wherein the ink comprises a binder selected from the group consisting of vinyl pyrrolidone, a water-soluble acrylic resin, an alcohol-soluble resin, an acrylic resin, a styrene-maleic resin, styrene-acrylate resin, a polyurethane resin, a polyvinyl acetal resin, a polyvinyl alcohol resin and a ketone resin.

7. A process for the production of the composite film according to claim 1 comprising the following steps, in that order:
    a) providing a carrier film;
    b) coating one surface of the carrier film with a solution comprising a solvent, the polyvinyl acetal or polyvinyl ethylene acetal, and the optional plasticiser;
    c) evaporating the solvent to obtain the film A on the one surface of the carrier film; and
    d) providing an obscuration area by printing or coating the surface of the film A not in contact with the carrier film with an ink layer.

8. A process for the production of a windshield comprising two sheets of glass, combined by an interlayer film comprising a film A containing a polyvinyl acetal and optionally, a plasticiser; and a film B containing a polyvinyl acetal and a plasticiser in an amount of at least 22% by weight; comprising the following steps, in that order:
    a) positioning the composite film according to claim 1 to the first glass sheet with the film A facing the first glass sheet;
    b) peeling off the carrier film from the film A; and
    c) positioning the film B on the film A or on the second glass sheet; and
    d) providing a stack of the layers comprising first glass sheet-film A-film B-second glass in that order; and
    e) laminating the stack obtained in step d) to produce the windshield.

9. A process for the production of a windshield comprising two sheets of glass, combined by an interlayer film comprising a film A containing a polyvinyl acetal and optionally, a plasticiser; and a film B containing a polyvinyl acetal and a plasticizer in an amount of at least 22% by weight; comprising the following steps, in that order:
    a) positioning the composite film according to claim 1 to the film B with the film A facing the film B;
    b) peeling off the carrier film from the film A;
    c) providing a stack of the layers comprising first glass sheet-film A-film B-second glass in that order; and
    d) laminating the stack obtained in step c) to produce the windshield.

10. A process for the production of a windshield comprising two sheets of glass, combined by an interlayer film comprising a film A containing a polyvinyl acetal and optionally, a plasticiser; and a film B containing a polyvinyl acetal and a plasticizer in an amount of at least 22% by weight; comprising the following steps, in that order:
    a) providing the composite film according to claim 1 and peeling off the carrier film from the film A;
    b) positioning the film A on the first glass sheet with the surface of film A provided with a printed or coated ink layer away from the first glass sheet;

c) positioning the film B on film A or on the second glass sheet;
d) providing a stack of the layers comprising first glass sheet-film A-film B-second glass in that order; and
e) laminating the stack obtained in step d) to produce the windshield.

11. A windshield obtained according to the process of claim 8.

\* \* \* \* \*